Patented June 10, 1952

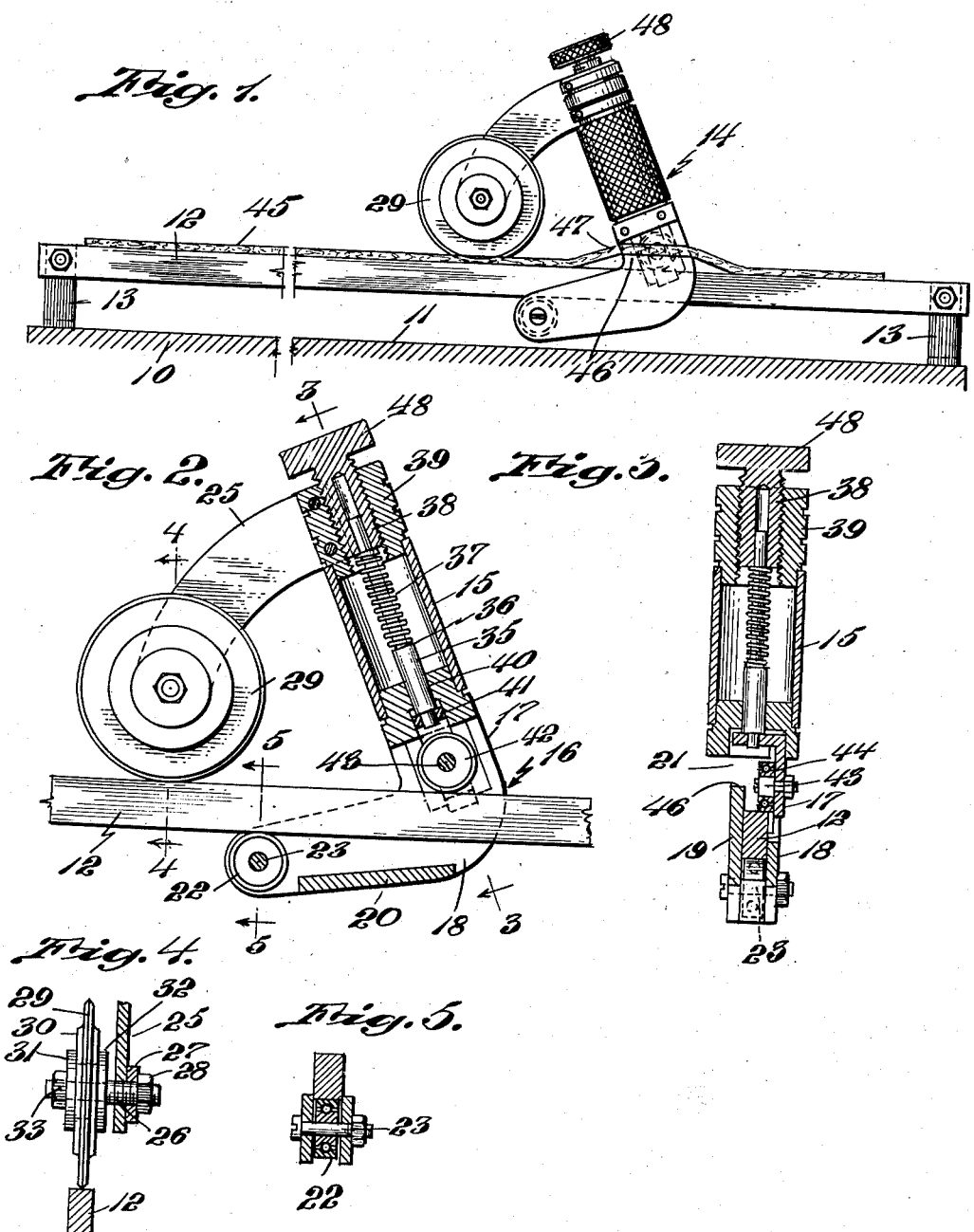

2,599,601

UNITED STATES PATENT OFFICE 2,599,601

HAND-OPERATED WEB CUTTING APPARATUS

Charles Gordon Axworthy, Pawtucket, R. I., assignor to Union Wadding Company, a corporation of Rhode Island Application January 27, 1950, Serial No. 140,867

8 Claims. (Cl. 164—77)

This invention relates to an apparatus or trimmer for cutting web material.

Heretofore, different arrangements have been attempted in an effort to provide some sort of a rolling cutter for cutting paper wadding, cloth or the like. Difficulty has been encountered in the cut web clogging the cutter or its carriage and also some difficulty has occurred in the pressures which may be had on the cutter.

One of the objects of this invention is to provide a device which will be self-clearing with such an arrangement that the cut portion of the web will fall away and not clog the throat of the carriage which mounts the cutter.

Another object of this invention is to provide a means of multiplying the resilient pressure which acts upon the cutter so that sufficient pressure may be provided to effectively cause cutting of the material worked on.

Another object of this invention is to provide an arrangement so that the pressure may be nicely controlled and varied throughout a desired range.

Another object of this invention is to provide an apparatus which will cut in many different planes either vertical, horizontal or inclined.

With these and other objects in view, the invention consists of certain novel features of construction, as will be more fully described and particularly pointed out in the appended claims.

In the accompanying drawings:

Figure 1 is an elevation showing the cutter as mounted upon a table, operating upon a piece of work;

Figure 2 is a sectional view through the carriage for the cutter showing a fragmental portion of the bar upon which the cutter operates;

Figure 3 is a sectional view on line 3—3 of Figure 2;

Figure 4 is a sectional view on line 4—4 of Figure 2; and

Figure 5 is a sectional view on line 5—5 of Figure 2.

In proceeding with this invention I have provided a bar and mounted a carriage to move along the bar, which carriage will carry a cutter. The carriage is so arranged that pressure may be applied at a point spaced from a fulcrum and through a leverage action which may multiply the resilient pressure used, I press a rolling cutter against the bar so that when rolled along the bar, it will sever the piece of paper, cloth, or a web of fibers, as may be desired.

With reference to the drawings, 10 designates a table having a horizontal surface 11 upon which I have mounted a metal bar 12 of rectangular cross section, as shown in Figure 4, by means of legs or supports 13. A carriage designated generally 14 is mounted to move along the bar 12.

This carriage consists essentially of a cylindrical body 15 from one end of which there extends a frame 16 consisting of an L-shaped leg having a portion 17 extending at generally right angles thereto. Parallel to the portion 18 and spaced therefrom there is another portion 19 similar to the portion 18 which is held in this spaced relationship by means of a bridge 20 which may be welded to both portions 18 and 19 to maintain them in spaced relation and generally parallel. An opening 21 is left between the portion 19 and the cylindrical body 15 sufficiently large so as to accommodate the rectangular bar 12, thus enabling the carriage to be placed upon or removed from the bar 12 as desired. At the outer end of portions 18 and 19 of the frame 16, a fulcrum roll 22 is mounted for free rotation upon a shaft 23. The roll is of a width slightly narrower than the width of the bar and serves to enable the carriage to roll along the bar while pivoting around the shaft 23.

An arm 25 extends from the upper end of the body 15 and from the same side thereof and in the same plane as the leg 16 and is arcuate although extending generally at right angles to the axis of the body 15. This arm is provided with a shaft 26 (see Figure 4) which threadedly engages the arm 25 and the enlarged boss 27 which is secured to the arm to increase the bearing surface of the opening. A nut 28 serves to bind the shaft in the adjusted position which it assumes in the arm. A cutting disc 29 is provided with hub 30 which is mounted for free rotation about the shaft 26 by means of an antifriction bearing and prevented from axial movement along the shaft by washers 32 engaging a shoulder on shaft 26 and washer 31 engaging the bearing and held in position by the nut 33 so as to guide the plane of movement of the cutter 26 with reference to the rod 12. By this arrangement the cutter may be adjusted laterally of the bar 12 so that the wear upon the bar may be distributed widthwise thereof.

In order to swing the entire carriage about the axis of the fulcrum roll 22 I have provided a plunger 35 within the body 15 which is shouldered as at 36, upon which shoulder a spring 37 presses, the pressure of which may be varied by the screw 38 which is threaded through the end 39 of the body so as to provide more or less pressure upon the spring 37 which forces the plunger 35 through its bearing 40. Upon the lower end of the plunger a framework 41 mounts the pressure roll 42 which has a ball bearing support 44 upon the shaft 43 carried by this frame 41, which shaft is mounted in the portion 17 of the leg 16. Thus, pressure at this point upon this roller tends to swing the entire frame about the shaft 23 as a fulcrum so as to force the cutter 29 against the top edge or opposite side of the bar 12 and the pressure that is exerted upon the upper side of the bar is multiplied in the ratio of the distance between the centers of the shafts 23 and 26 and 43.

When it is desired to cut a web of material such as 45, shown in Figure 1, it is merely necessary to lay the material upon the bar 12 and move the carriage along the bar so that the cutter 29 will roll upon and cut the material by the pressure of the sharp edge against the anvil-like flat surface of the bar. The edge 46 of the portion 19 is raised sufficiently so as to direct the cut portion of the web upwardly as shown at 47 in Figure 1, relieving it from the throat of the carriage and eliminating the clogging of the carriage by the work material.

The screw 38 is provided with a handle 48 for easy adjustment of the pressure desired, this handle being knurled on its outer surface for convenient manipulation. This apparatus is so arranged that it may operate in either a horizontal plane, as shown, or in a vertical plane or a diagonal plane, pressure which is exerted on the cutter serving to maintain the carriage in such position to which it may be moved by hand, even when the bar is in a vertical position.

I claim:

1. A hand-operated web cutting apparatus comprising a bar, a carriage movable along said bar, a fulcrum member fixed to the carriage and engaging one side of the bar, a circular cutter secured to the carriage and engageable with the opposite side of the bar when the carriage is swung about said member as a fulcrum and pressure means carried by said carriage and engaging said bar at such location and in such direction as to swing said carriage about said member in a direction to force the cutter against the bar.

2. An apparatus as in claim 1 wherein said fulcrum member is a roller.

3. An apparatus as in claim 1 wherein said cutter is adjustable along its axis to differently track upon said bar.

4. An apparatus as in claim 1 wherein said carriage has guide means engaging opposite sides of said bar to direct the carriage in its movement along said bar.

5. An apparatus as in claim 1 wherein said pressure means comprises a plunger engaging the opposite side of the bar from said fulcrum member, and said fulcrum member with respect to the longitudinal axis of the bar is intermediate the cutter and plunger.

6. An apparatus as in claim 1 wherein said pressure means comprises a plunger having a roller engaging the opposite side of the bar from said fulcrum member, and said fulcrum member with respect to the longitudinal axis of the bar is intermediate the cutter and plunger.

7. An apparatus as in claim 1 wherein said pressure means comprises a plunger engaging the opposite side of the bar from said fulcrum member and a spring acting on said plunger, and said fulcrum member with respect to the longitudinal axis of the bar is intermediate the cutter and plunger.

8. An apparatus as in claim 1 wherein said pressure means comprises a plunger engaging the opposite side of the bar from said fulcrum member, a spring acting on said plunger and means to adjust the pressure of said spring, and said fulcrum member with respect to the longitudinal axis of the bar is intermediate the cutter and plunger.

CHARLES GORDON AXWORTHY.

REFERENCES CITED

The following references are of record in the file of this patent:

UNITED STATES PATENTS

| Number | Name | Date |
|---|---|---|
| 745,517 | Perks | Dec. 1, 1903 |
| 1,053,359 | Clark | Feb. 18, 1913 |
| 1,745,476 | Cohn | Feb. 4, 1930 |